United States Patent [19]
Kawai

[11] Patent Number: 5,347,105
[45] Date of Patent: Sep. 13, 1994

[54] WELDING CONTROLLER

[75] Inventor: Shingo Kawai, Nagoya, Japan

[73] Assignee: Nadex Co., Ltd., Nagoya, Japan

[21] Appl. No.: 52,906

[22] Filed: Apr. 27, 1993

[30] Foreign Application Priority Data

May 1, 1992 [JP] Japan ................. 4-140044

[51] Int. Cl.⁵ ............................................. B23K 11/24
[52] U.S. Cl. ............................... 219/110; 219/109
[58] Field of Search ................... 219/109, 110

[56] References Cited

U.S. PATENT DOCUMENTS

| 4,302,653 | 11/1981 | Denning et al. | |
|---|---|---|---|
| 4,442,337 | 4/1984 | Nakata et al. | 219/110 |
| 4,456,810 | 6/1984 | Schumacher et al. | 219/110 |
| 4,503,311 | 3/1985 | Houchens et al. | 219/110 |
| 4,542,277 | 9/1985 | Cecil | 219/109 |
| 4,678,887 | 7/1987 | Nagel et al. | 219/110 |
| 4,694,135 | 9/1987 | Nagel et al. | 219/110 |
| 4,711,984 | 12/1987 | Bilge et al. | 219/110 |
| 4,861,960 | 8/1989 | Haefner et al. | 219/110 |
| 5,111,020 | 5/1992 | Stiebel | 219/110 |

FOREIGN PATENT DOCUMENTS

57-146485  9/1982  Japan.
58-181488  10/1983  Japan.
62-18273  4/1987  Japan.

Primary Examiner—Clifford C. Shaw
Attorney, Agent, or Firm—Dennison, Meserole, Pollack & Scheiner

[57] ABSTRACT

A controller for a welding machine which requires no change of control programs, even if there is any change in material, thickness or others of workpieces is provided. After start of welding, welding current and/or pinching force increase, until there occurs a phenomenon that interelectrode resistance shifts from an upward tendency to a downward tendency, and thereafter the values at this time are maintained. The values are proper, and proper welding is performed. This is achieved, irrespective of material, thickness or others of the workpieces, so that there is no need of changing control programs one by one.

9 Claims, 12 Drawing Sheets

WELDING CONTROLLER

BACKGROUND OF THE INVENTION

1. Field of the Invention

The present invention relates to a controller for a welding machine in which workpieces are pinched between a pair of electrodes through which welding current is supplied to the workpieces to cause the workpieces to be heated and welded.

2. Description of the Prior Art

It has been well known that welding current and pinching force must be properly controlled to assure a good welding result in such a type of welding machine.

For example, Japanese Patent Publication No. 62-18273 has proposed a technique in which a target welding resistance curve is predetermined, and welding current is so controlled that resistance may be varied along the target curve. Japanese Laid-Open Patent Publication No. 57-146485 discloses a technique in which resistance is differentiated with time, and the result thus obtained is compared with a predetermined value so as to increase or decrease welding current in accordance with the comparison result. Japanese Laid-Open Patent Publication No. 58-181488 discloses a technique in which interelectrode voltage is so controlled as to be varied along a predetermined target curve.

In the prior art, a target curve, a predetermined value or the like is used to control welding current. In other words, a reference value in any sense is used. Such a reference value must be, of course, changed in correspondence with variations in, for example, material, thickness, number, coating layer or others of the workpieces.

Therefore, proper welding current, pinching force or the like must be experimentally obtained or calculated for each specific application of the welding machine. This causes a substantial burden to a user, manufacture or dealer of such a welding machine. Particularly in these days, where workpieces have a tendency of variously changing in material, thickness, coating layer or others, determination of a reference value for each welding condition has caused a considerable burden.

In order to meet various conditions, reference values corresponding to respective welding conditions must be stored, causing the requirement of a large memory as well as complicating the operation for controlling the machine which may disadvantageously degrade facility of the machine.

Even if the workpieces are uniform, repeated welding operations may cause changes with time such as an increase of the electrode diameter, and the process for correcting such a change must be prepared preliminary to each welding condition.

Japanese Patent Publication No. 62-18273 has proposed a technique in which, in case a preceding welding time is too long, the welding current is increased in the following welding, while, in case the preceding welding time is too short, welding current is decreased in the following welding. This technique can adjust the welding current to an optimum with no need of preliminarily defining reference values, but is effective only when uniform welding operations are repeatingly carried out. For example, in case of welding electrodes attached to a robot or the like to carry out welding at different positions, it is impossible to increase or decrease the current value in accordance with the result of the preceding process as taught in the above described Japanese Patent Publication No. 62-18273.

SUMMARY OF THE INVENTION

It is an object of the present invention to provide a novel welding controller in which a definition of optimum or reference values for each welding condition is not required, and consequently the welding operator is relieved from inputting operation values in response to each change of welding conditions.

To achieve this object, the present invention provides a controller for a welding machine in which workpieces are pinched between a pair of electrodes through which welding current is supplied to weld the workpieces. The welding controller comprises means for detecting an amount of resistance between the electrodes, means for monitoring occurrence of a phenomenon that the interelectrode amount of resistance detected by the detecting means shifts from an upward tendency to a downward tendency, and welding current adjusting means for increasing the amperage of welding current with time from a low value which is insufficient for welding, until the time where the monitoring means senses the occurrence of the phenomenon, and from this time, maintaining the amperage substantially constant.

As is well known in the art, when welding current begins to be supplied, interelectrode resistance at first decreases due to reduction of contact resistance, and then increases due to rising of temperature of workpieces, and finally begins to decrease due to growth of nugget. Specifically, the timing when interelectrode resistance shifts from an upward tendency to a downward tendency corresponds to the timing when nugget begins to grow up.

According to the present invention, welding current gradually increases, until nugget begins to grow up, and thereafter the amperage of welding current at the beginning of growth of the nugget is maintained while the nugget is growing. The welding current at the beginning of growth of the nugget is a proper value, neither excessive nor insufficient.

According to another aspect of the present invention, there is provided a controller for a welding machine in which workpieces are pinched between a pair of electrodes through which welding current is supplied to weld the workpieces, with the force for pinching the workpieces being variable. The controller comprises means for detecting an amount of resistance between the electrodes, means for monitoring occurrence of a phenomenon that interelectrode resistance detected by the detecting means shifts from an upward tendency to a downward tendency, and pinching force adjusting means for increasing pinching force with time from a low value insufficient for welding, until the monitoring means monitors the occurrence of the phenomenon, and from this time on maintaining the pinching force level substantially constant.

In this controller, pinching force increases, until nugget begins to grow up, and thereafter the pinching force at the beginning of growth of the nugget is maintained while the nugget is growing. The pinching force at the beginning of growth of the nugget is a proper value, neither excessive nor insufficient.

According to a further aspect of the present invention, there is provided a controller for a welding machine in which workpieces are pinched between a pair of electrodes through which welding current is supplied to weld the workpieces, with the force for pinching the workpieces being variable. The controller comprises means for detecting an amount of resistance between the electrodes, means for monitoring occurrence of a phenomenon that interelectrode resistance detected by the detecting means shifts from an upward tendency to a downward tendency, and welding current/pinching force adjusting means for increasing the amperage of welding current and pinching force with time from respective low values insufficient for welding, until the monitoring means monitors the occurrence of the phenomenon, and the amperage of welding current from this time on maintaining the pinching force levels substantially constant.

In this controller, both of the amperage of welding current and pinching force increase, until nugget begins to grow up, and thereafter the amperage of welding current and the pinching force at the beginning of growth of the nugget are maintained while the nugget is growing. The combination of the amperage of welding current and the pinching force at the beginning of growth of the nugget is a proper value, neither excessive nor insufficient.

According to a further aspect of the present invention, there is provided a controller for a welding machine in which workpieces are pinched between a pair of electrodes through which welding current is supplied to weld the workpieces. The controller comprises means for detecting an amount of displacement of an electrode and/or acoustic emission, means for monitoring occurrence of a phenomenon that the signal detected by the detecting means shifts from an upward tendency to a constant level, and means for increasing at least one of the amperage of welding current and force for pinching the workpiece with time from a low value insufficient for welding, until the monitoring means monitors the occurrence of the phenomenon, and thereafter maintaining the amperage of welding current and the pinching force at constant values.

In this controller, the beginning of growth of nugget is determined upon the basis of the fact that displacement of the electrode and acoustic emission increase, until nugget begins to grow up, and thereafter they are kept constant. After the beginning of growth of the nugget, the amperage of welding current and others at the time are maintained to properly carry out welding.

According to the present invention, welding current as well as pinching force are properly adjusted.

Thus, the present invention requires no preliminary definition of reference or optimum values and no change thereof. It should be noted that the term "to maintain" is not limited to strictly maintain a value, but includes to maintain neighborhood of the value.

According to the present invention, welding current and/or pinching pressure gradually increase, until nugget begins to normally grow up, and after such beginning of growth of nugget is detected, the amperage of welding current and/or the pinching force at the beginning of growth of nugget are maintained. The amperage of welding current and the pinching force at the beginning of growth of nugget are proper values, neither excessive nor insufficient.

Thus, the present invention requires no preliminary definition of reference or optimum values. Specifically, even if there are various welding conditions, it is not necessary to set reference values for respective welding conditions, or the operator is not required to change reference values.

The invention assures a remarkable improvement of facility of the welding machine.

DETAILED DESCRIPTION OF THE PREFERRED EMBODIMENTS

First Embodiment (Adjustment of Welding Current and Adjustment of Welding Time)

Figure 1:
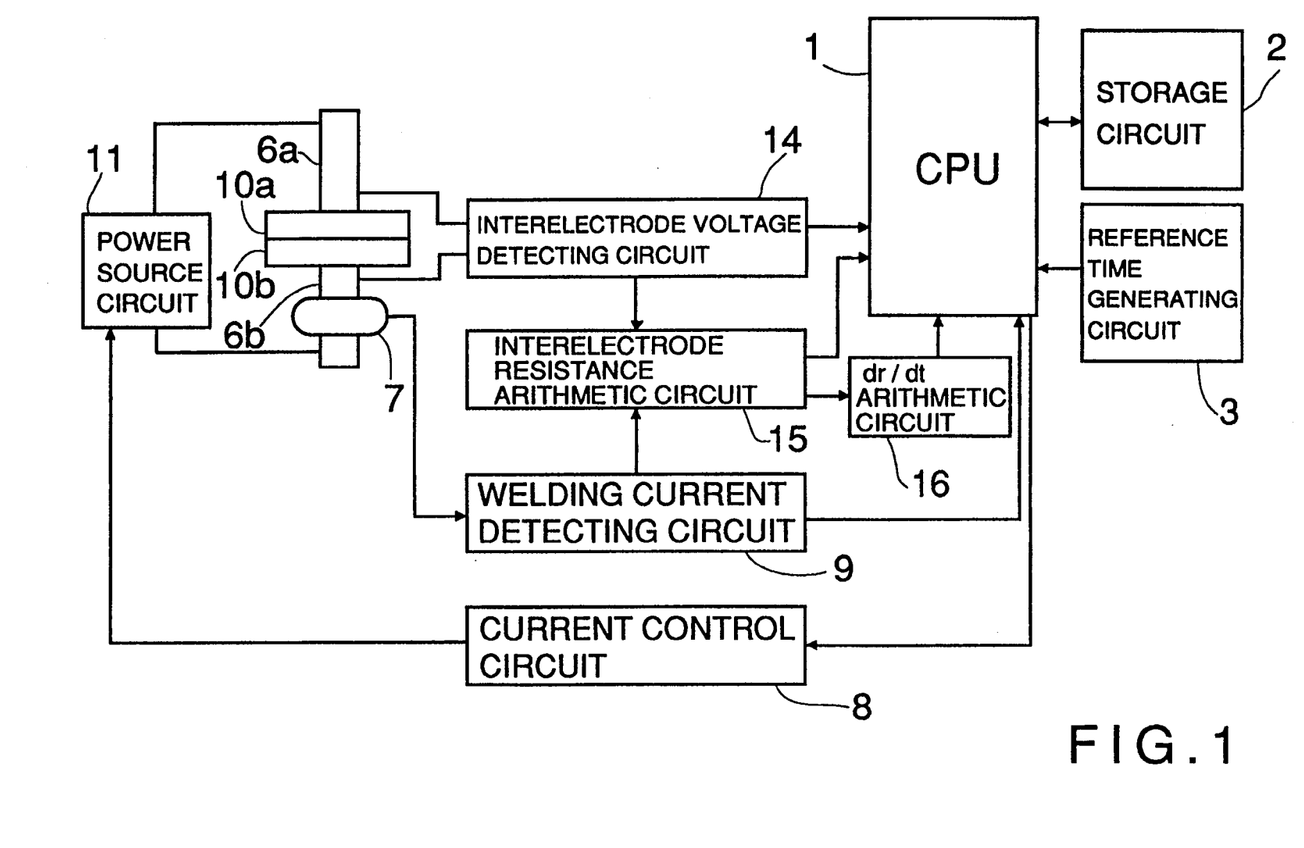
FIG. 1 is a block diagram showing a system configuration of a controller for a welding machine according to a first embodiment of the present invention.

FIG. 1 shows a system configuration of a first embodiment, in which workpieces 10a, 10b are pinched between a pair of electrodes 6a, 6b and are supplied with welding current from a power source circuit 11. The amperage of welding current is adjustable through a current control circuit 8. The current control circuit 8 is controlled by a central processing unit (CPU) 1 so as to adjust welding current to the amperage directed by CPU 1.

Interposed between the electrodes 6a, 6b is a detecting circuit 14 for detecting interelectrode voltage, and the detected value by the detecting circuit 14 is inputted to the CPU 1. Attached to one of the electrodes, in this case 6b, is a current detector 7 whose detection signal is sent to a welding current detecting circuit 9. The detected value by the circuit 9 is inputted to the CPU 1. Detection signals from the voltage detecting circuit 14 and the current detecting circuit 9 are sent to an arithmetic circuit 15 for computing interelectrode resistance, and a signal thus obtained for indicating interelectrode resistance is inputted to the CPU 1. The signal thus obtained for indicating interelectrode resistance is further inputted to a circuit 16 adapted for differentiating interelectrode resistance, and a signal corresponding to the time differentiated value is inputted to the CPU 1.

Figure 4:
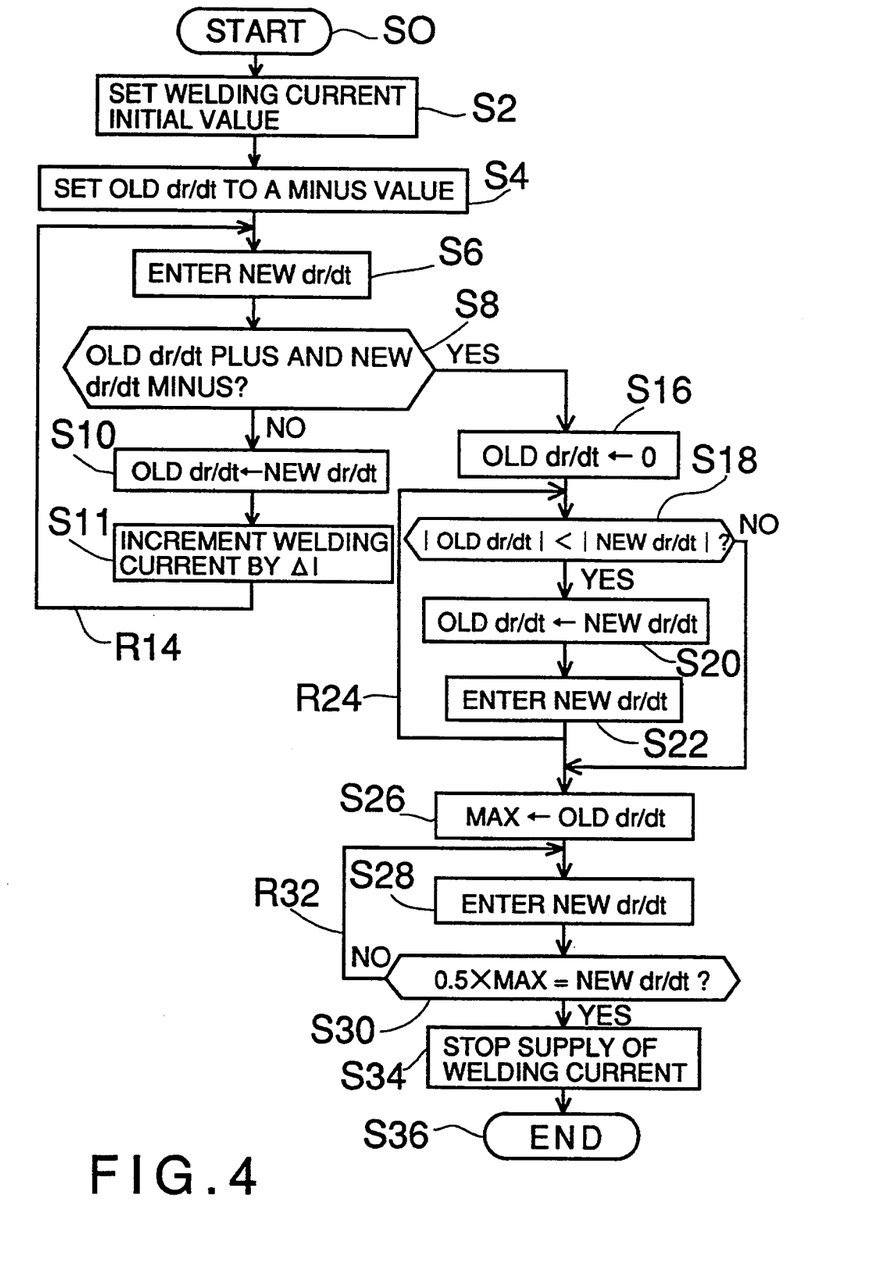
FIG. 4 is a flow chart of a procedure of the first embodiment.

The CPU 1 is connected with a circuit 2 for storing a program to be used for executing a procedure shown in FIG. 4 and a circuit 3 for generating a pulse for every reference period or increment of time. Though interelectrode resistance is calculated from voltage and current in this embodiment, such resistance may be calculated from current only, on condition that interelectrode voltage is constant.

Figure 2:
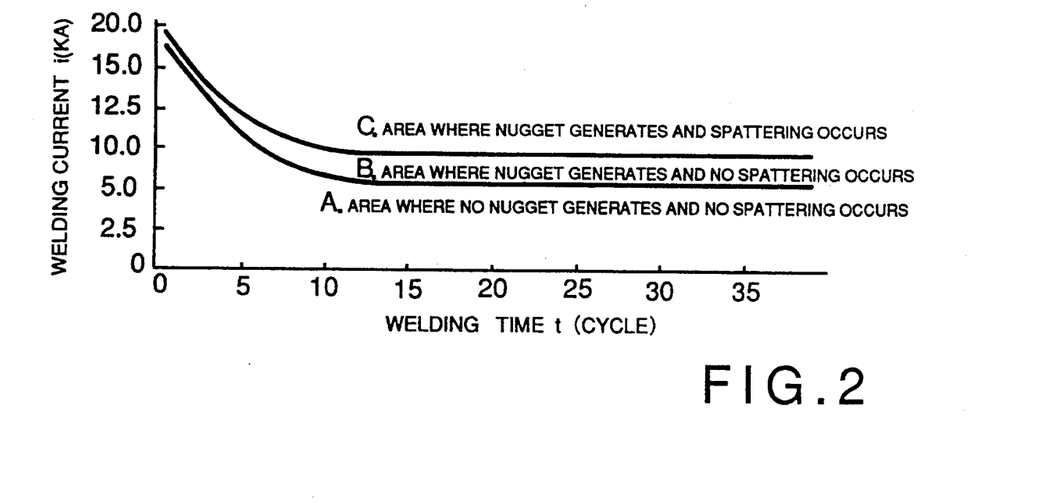
FIG. 2 is a graph illustrating a proper value area of welding current.

FIG. 2 shows the relationship of welding current and welding time. In an area A, welding current is insufficient, causing no spattering and no nugget. On the contrary, in an area C, welding current is excessive, permitting not only generation of nugget but also occurrence of spattering which will cause insufficient welding strength and poor appearance of the welded portion. An area B is a proper area in which nugget is generated but no spattering occurs.

Figure 3:
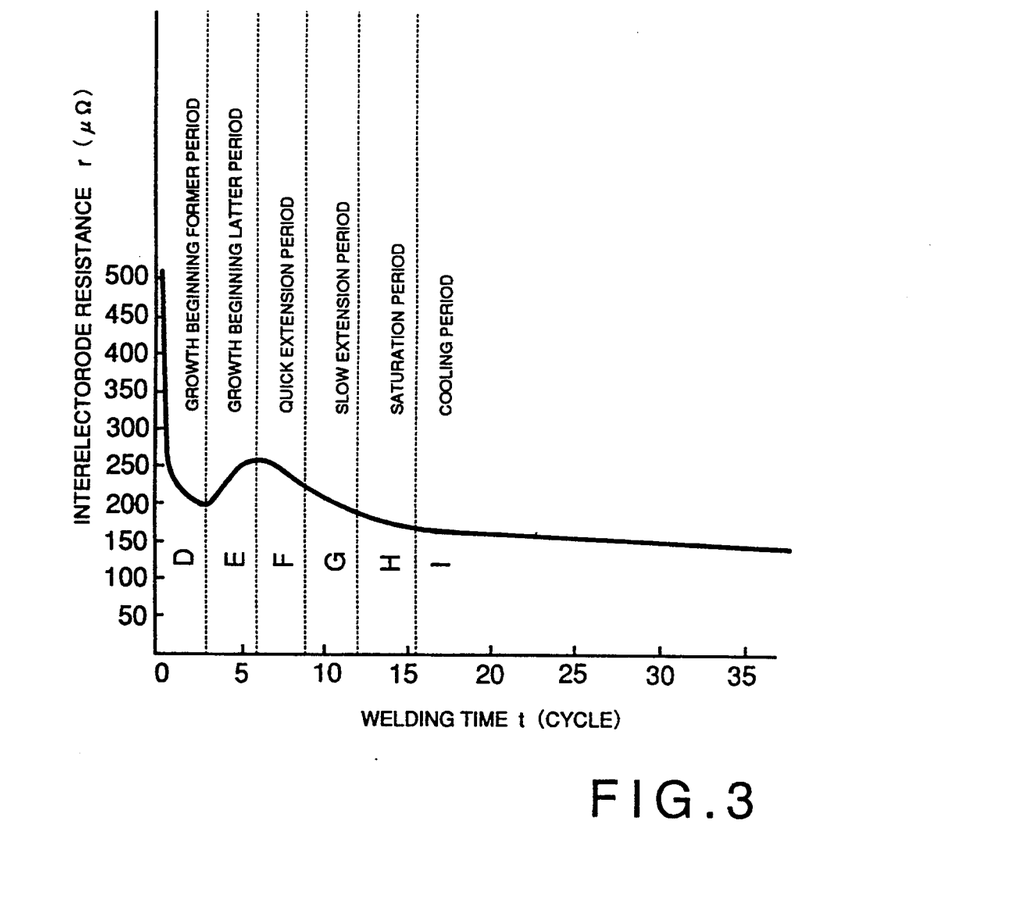
FIG. 3 is a graph illustrating the relationship between the progress of welding and change of interelectrode resistance.

It is known that, if welding current is supplied under the proper condition in the area B, interelectrode resistance changes in progress of welding as shown in FIG. 3.

There is a growth beginning former period just after beginning of power supply. In this period, resistance decreases due to reduction of contact resistance of the workpieces. This former period is followed by a growth beginning latter period. In this latter period, resistance increases due to rising of temperature of the workpieces. The latter period is followed by a quick extension period, in which nugget grows up quickly with corresponding reduction of resistance. Thereafter, resistance is gradually lowered at a lowering speed which is slowly reduced, until it finally reaches a substantially constant value. This stage is performed in a slow extension period, a saturation period and a cooling period.

FIG. 4 shows a flow chart of the procedure which is executed by the CPU I in accordance with the program stored in the storage circuit 2.

At first, when welding is started in Step SO, an initial value of welding current begins to flow in Step S2. The initial value is indicated by Io in FIG. 5(a) and set to be a value low enough to prevent beginning of welding of workpieces which can be welded with a minimum amperage. Then, a previously calculated time derivative of resistance (old dr/dt) is set to a minus value as an initial value in Step S4. Then, in Step S6, a current time derivative of resistance is calculated and entered to be used as a new dr/dt.

Figure 5A:
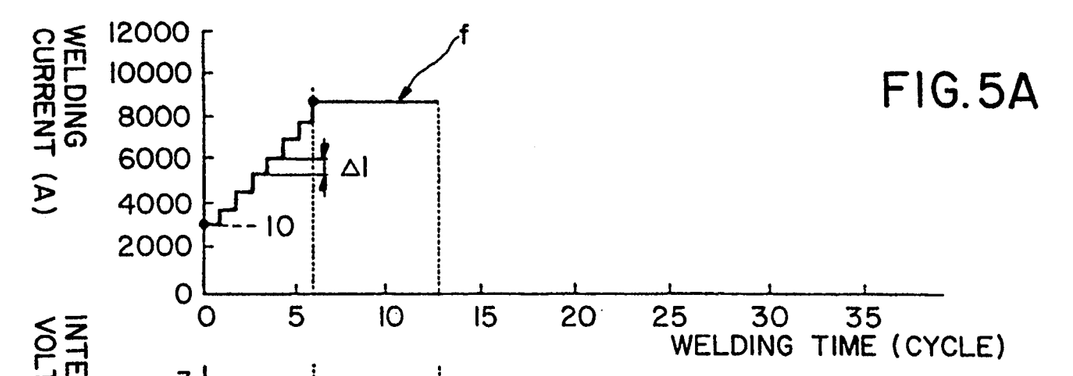
FIGS. 5(a) to 5(e) are graphs illustrating the operation of the first embodiment.
Figure 5B:
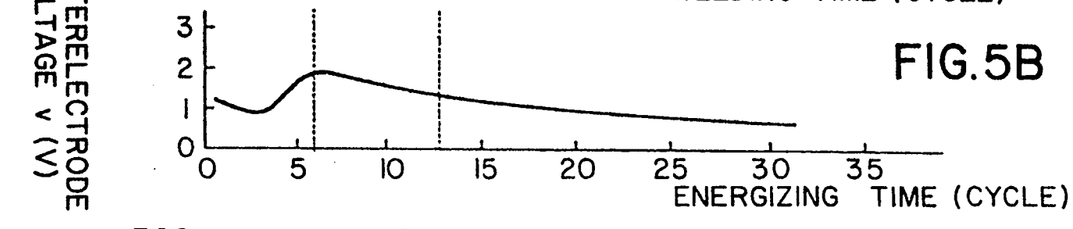
Figure 5C:
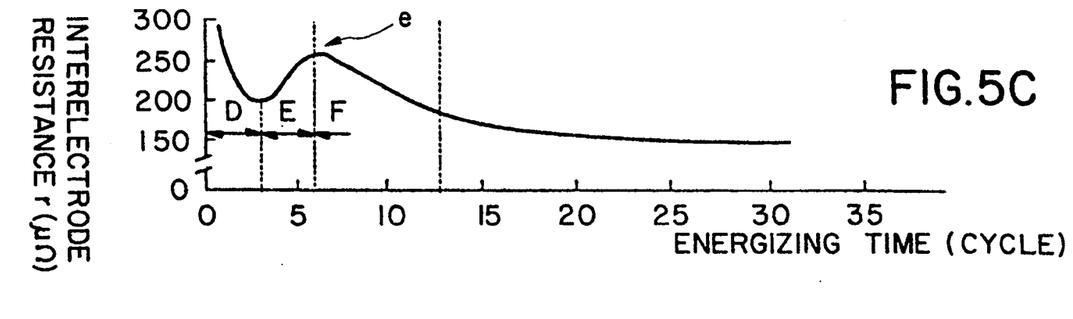
Figure 5D:
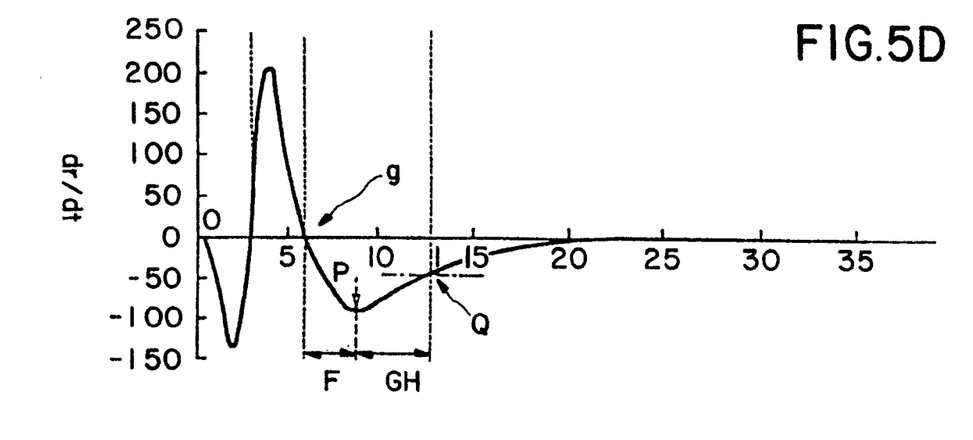
Figure 5E:
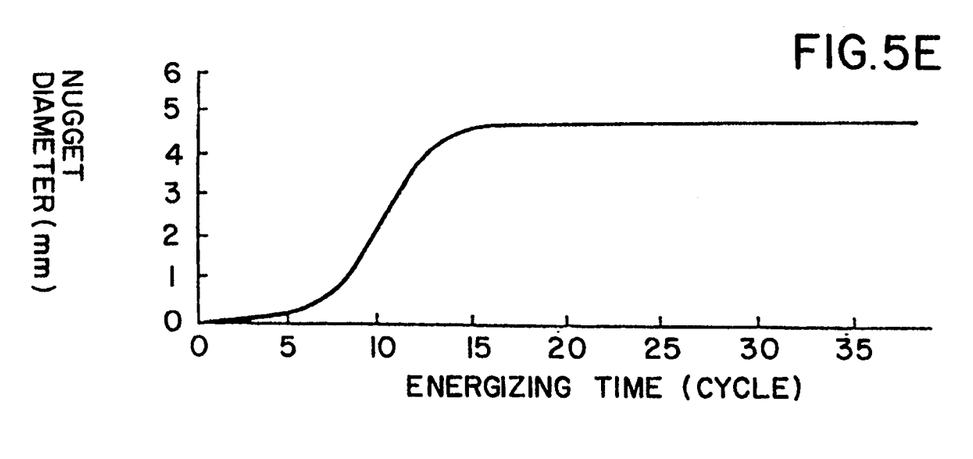

In Step S8, the CPU 1 discriminates whether the previous rate of change of resistance (old dr/dt) is a plus value and the current rate of change of resistance (new dr/dt) is a minus value or not. Specifically, the CPU 1 discriminates whether there occurs a phenomenon that resistance has increased but begins to decrease at this time or not. As shown in FIG. 5(c), resistance usually decreases just after beginning of power supply, that is, old and new values of dr/dt are minus values, and the CPU 1 discriminates as "no" in Step S8. In each "no" case, the rate of change of resistance is updated in Step S10, and welding current incremented by ΔI in Step S11, and then control returns to Step S6 (loop R14). Consequently, the welding current I is incremented by ΔI, as shown in FIG. 5(a). As the temperature of the workpieces rises along with increment by ΔI, the resistance begins to increase. Specifically, dr/dt changes from minus to plus, as shown in FIG. 5(d) and thereafter is kept plus. As the CPU 1 continues to discriminate as "no" in Step S8 in this period, the amperage of welding current continues to be incremented by ΔI.

The welding current is incremented by ΔI, until nugget begins to grow up, when the resistance shifts from an upward tendency to a downward tendency at a point e in FIG. 5(c). Specifically, dr/dt changes from plus to minus at a point g in FIG. 5(d). At this time, the CPU 1 discriminates as "yes" in Step S8. In case of "yes" in Step S8, Step S11 is skipped. Consequently, welding current is maintained at the amperage thereafter, as shown by line f in FIG. 5(a). The amperage of welding current thus maintained is a minimum value which permits growth of nugget, neither excessive nor insufficient.

Thus in this embodiment, Step S8 constitutes means for monitoring occurrence of the phenomenon that the interelectrode resistance shifts from an upward tendency to a downward tendency, and after the CPU 1 discriminates as "yes" in Step S8, Step S11 is skipped, and this process constitutes current adjusting means which controls the welding current to be incremented before the occurrence of the phenomenon and maintains current constant thereafter. In this embodiment, welding current is maintained constant by skipping Step S11. The actual measurement of welding current will show slight fluctuations due to fluctuation of the power source, but a substantially satisfactory welding result is achievable. Specifically, strict maintenance of welding current is not required, but substantial maintenance is allowable.

When interelectrode resistance shifts from an upward tendency to a downward tendency, or when nugget begins to grow up and welding proceeds to the quick extension period shown in FIG. 3, the old rate of change (old dr/dt) is initialized to zero in Step S16 (This is an artificial process for detecting a peak values of dr/dt). Then, the absolute value of old dr/dt and new dr/dt are compared in Step S18. As the absolute value of the rate of change of resistance (dr/dt) increases in the period F in FIG. 5(d), that is in the quick extension period, the CPU I discriminates as "yes" in Step S18. In this case, old dr/dt is updated in Step S20, and new dr/dt is updated in Step S22. While the absolute value of the rate of change of resistance (dr/dt) continues to increase, that is, in the quick extension period as shown by F in FIG. 5(d), the above process is repeated (loop R24 in FIG. 4), and welding current is maintained at the amperage at the beginning of growth of nugget.

The quick extension period of nugget is followed by a slow extension period in which the absolute value of the rate of change of resistance dr/dt begins to decrease, as shown in FIG. 5(d). At this time, the CPU 1 discriminates as "no" in Step 18 in FIG. 4, and a next step S26 is executed. In Step S26, the rate of change of resistance at the beginning of the decrease of the absolute value (old dr/dt or a peak value of the rate of change shown by a point P in FIG. 5(d)) is stored as MAX.

Steps S28 and S30 in FIG. 4 are repeatedly executed to repeat a loop R32, until the absolute value of the rate of change reaches 50% of the peak value MAX. When the absolute value of the rate of change decreases to 50% of the peak value, CPU discriminates as "yes" in Step S30, and supply of welding current is stopped in Step S34. Specifically, the amperage of welding current at the beginning of growth of nugget is maintained, until the absolute value of the rate of change reaches 50% of the peak value, and thereafter supply of welding current is stopped, as shown in FIGS. 5(a) and 5(d). It is experimentally known that the timing when the absolute value of the rate of change of resistance reaches 50% of the peak value corresponds to the saturation period shown in FIG. 3. It is also known that supply of welding current up to the timing assures substantially completed welding. Welding current may be stopped, when dr/dt becomes less than a certain minute value. As it is also known that dr/dt at the time when welding is substantially completed is a minute value, irrespective of material, thickness or other features of workpieces, welding can be stopped at a proper timing in this way, irrespective of the welding conditions.

In this embodiment, welding current is adjusted in accordance with the timing when resistance shifts from an upward tendency to a downward tendency (which corresponds to the timing the rate of change shift from plus to minus), so that there is no need of preliminarily defining any reference value. As welding time is adjusted in accordance with the timing when the rate of change of resistance reaches 50% of the peak value, there is no need of preliminarily defining any reference time. As the above phenomenon is commonly adaptable, irrespective of material, thickness, number or other features of workpieces, the same program is adaptive to wide-range welding conditions, eliminating troublesome changing of programs or of reference values by an operator.

Second Embodiment (Adjustment of Pinching Pressure)

Figure 6:
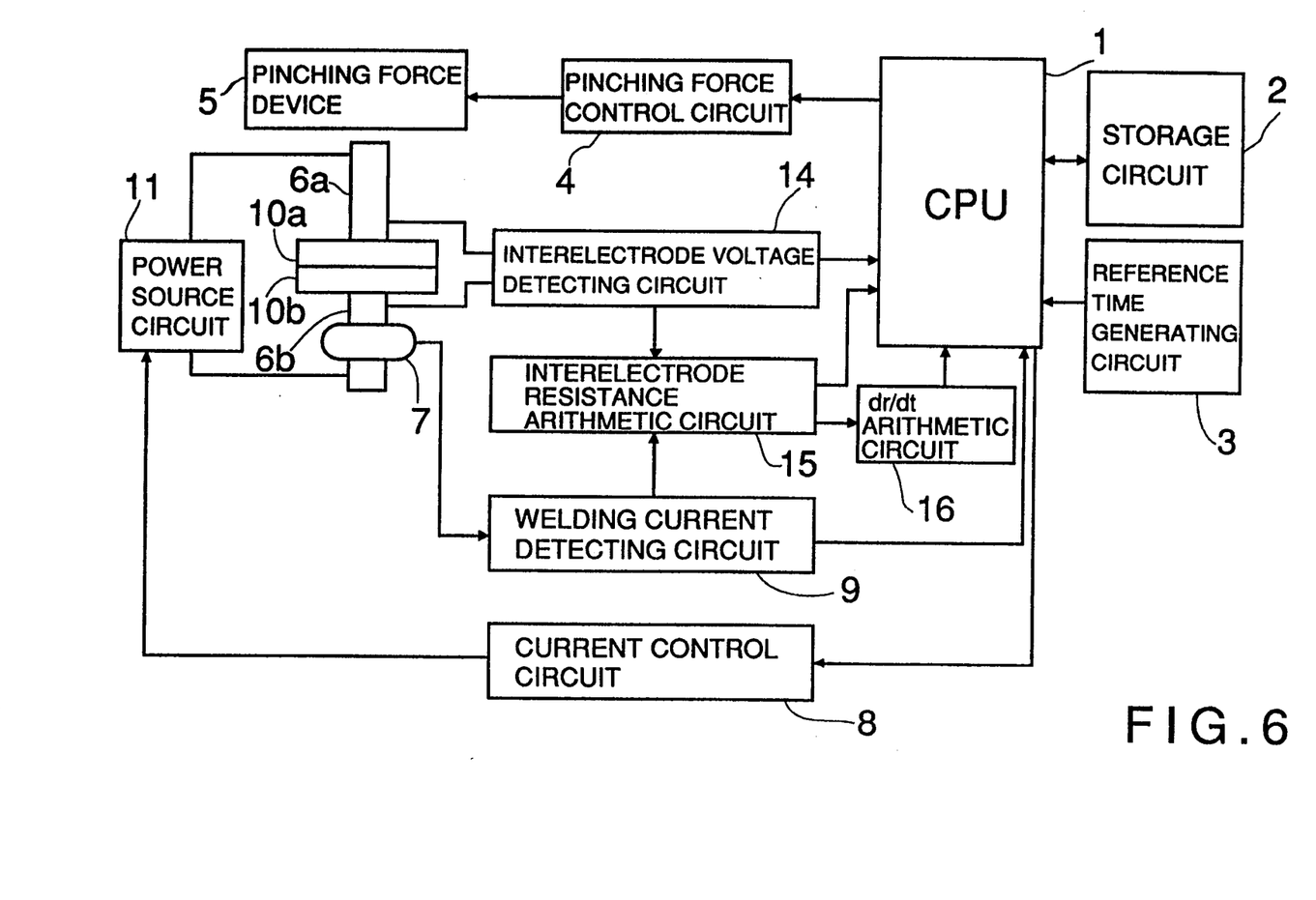
FIG. 6 is a block diagram showing a system configuration of the controller according to a second and a third embodiment.

FIG. 6 shows a system configuration of a second embodiment. This embodiment is different from the first embodiment in that a pinching pressure device 5 and a device 4 for control pinching force are added. The pinching force control device 4 controls pinching force of the pinching force device 5 so as to conform with a value indicated by the CPU 1.

In this embodiment, after pinching force reaches a proper value, welding current for assuring proper progress of welding is previously supplied. Then, pinching force is incremented, until the rate of change of resistance dr/dt changes from plus to minus, that is, resistance shifts from an upward tendency to a downward tendency in the same way as the loop R14 in which Steps S6 to S12 in FIG. 4 are repeated. For this purpose, Step S11 in FIG. 4 is replaced by a process of "incrementing pinching force by ΔP". In this embodiment, pinching force is maintained at the value at beginning of growth of nugget. As the pinching force is neither excessive nor insufficient, welding can be carried out with pinching force kept at the proper value. Preliminarily definition of a reference value as to pinching force is not required in this embodiment.

Third Embodiment (Adjustment of Welding Current and Pinching Force)

This embodiment includes the same system configuration as that of the second embodiment shown in FIG. 6. In this embodiment, Step S11 in FIG. 4 is replaced by a process of "incrementing welding current by ΔI and incrementing pinching force by ΔP". Consequently, both the welding current and the pinching force increase, until nugget begins to grow up, and thereafter the amperage of welding current and the pinching force at the beginning of growth of nugget are maintained substantially constant, so that welding is carried out properly.

Fourth Embodiment (Improvement of the Third Embodiment)

Figure 7:
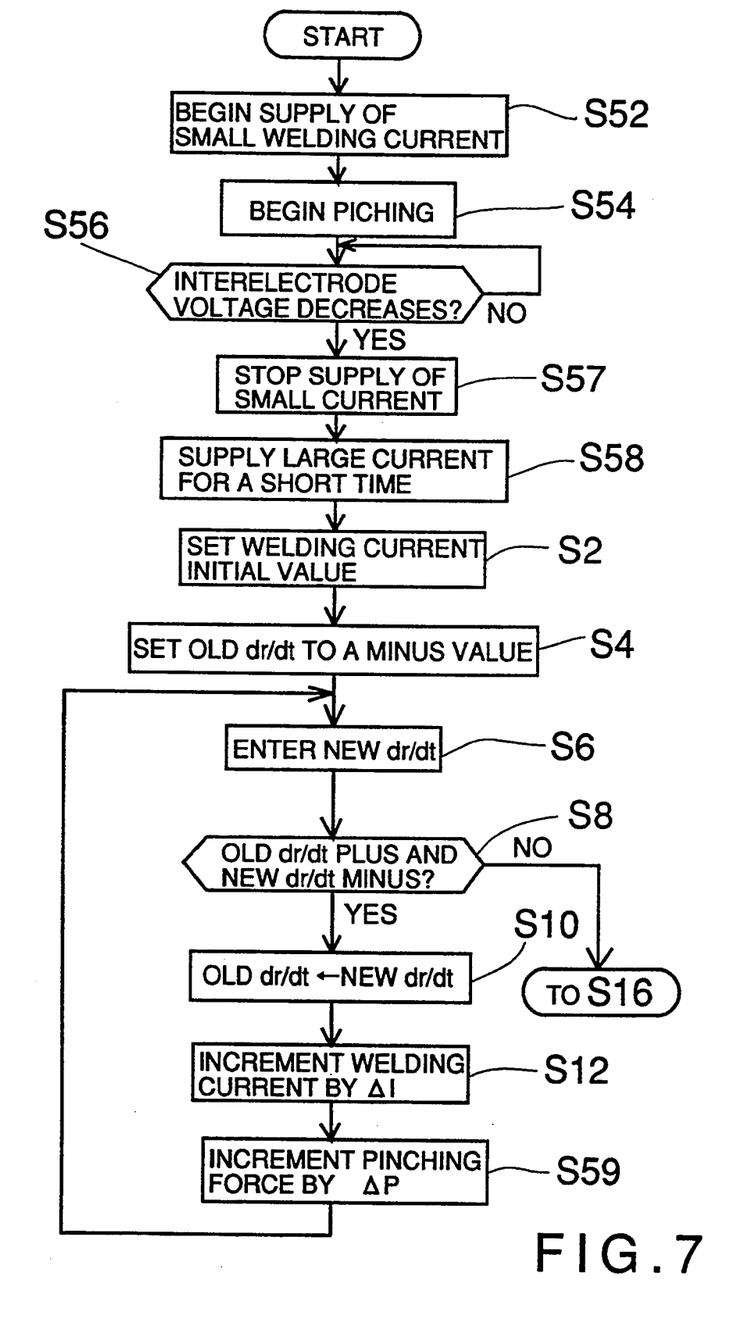
FIG. 7 is a flow chart of a procedure of a fourth embodiment.
Figure 8:
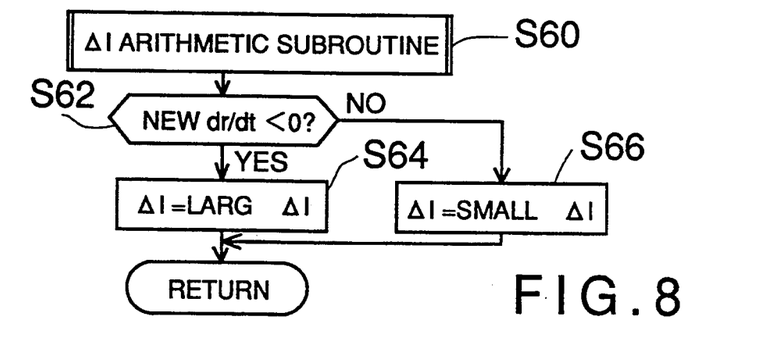
FIG. 8 is a flow chart of a procedure for determining an increment of welding current in the fourth embodiment.

This embodiment includes the system configuration as shown in FIG. 6, and the procedure is improved as shown in FIGS. 7 and 8, providing the following characteristics.

(Automated Pinching)

Figure 10:
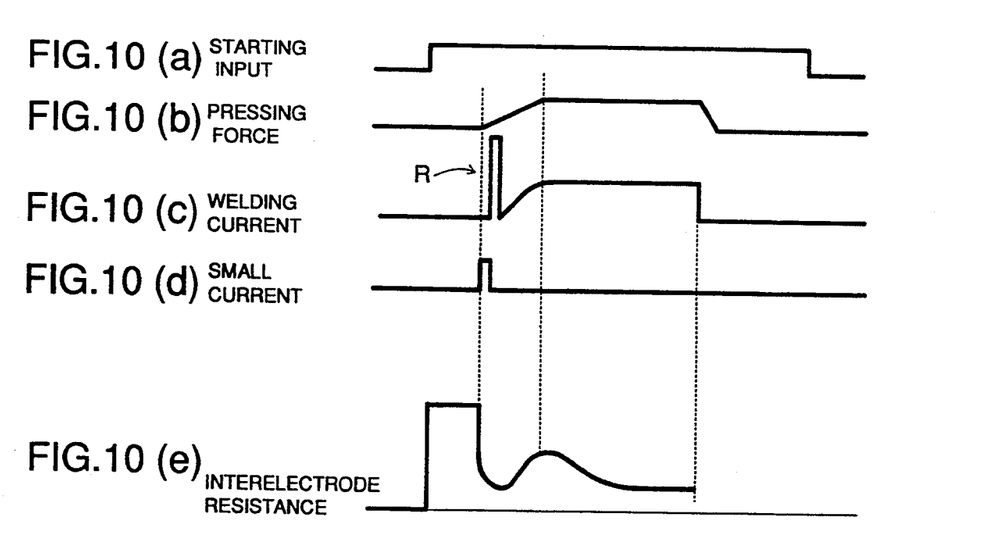
FIGS. 10(a) to 10(e) are diagrams illustrating the operation of the fourth embodiment.

Referring to FIG. 7, when start of welding is indicated, a small current is prepared to flow between the electrodes in Step S52. At first, as the electrodes are apart from each other and the workpieces are not yet pinched therebetween actually, no current flows. Then, the distance between the electrodes begins to be reduced in Step S54. When the distance between the electrodes is reduced enough to pinch the workpieces therebetween, the small current flows, as shown in FIG. 10(d), and consequently interelectrode resistance decreases. Specifically, when the CPU 1 discriminates as "yes" in Step S56, it is established that the workpieces are pinched between the electrodes.

(Short Time Supply of Large Current)

Just after the workpieces are pinched between the electrodes, a large welding current is supplied for a short period of time (See R in FIG. 10(c)). The large welding current is set to such an amperage as to cause the resistance component of the surface coating layer to be eliminated but to prevent occurrence of spattering.

As supply of the large current causes the resistance component of the coating layer to be eliminated, welding current and welding time are adjusted to optimum values in the same process as that in the third embodiment. Specifically, there is no possibility that the resistance component of the coating layer would interfere with optimum adjustment of welding current and welding time.

(Adjustment of the Rate of Increase of Welding Current)

In this embodiment, the increment ΔI of current used in Step S12 in FIG. 7 is determined as shown in FIG. 8. In Step S62, the CPU 1 discriminates whether the rate of change of resistance dr/dt is plus or minus to discriminate whether welding progress is in the period S or T. If welding progress is in the period S and dr/dt is minus, the increment ΔI is set to a large value LARGΔI in Step S64. As the result, welding current promptly increases, as shown in the period S in FIG. 11(a). This allows the time required for the process of searching for an optimum of welding current to be reduced.

Figure 11:
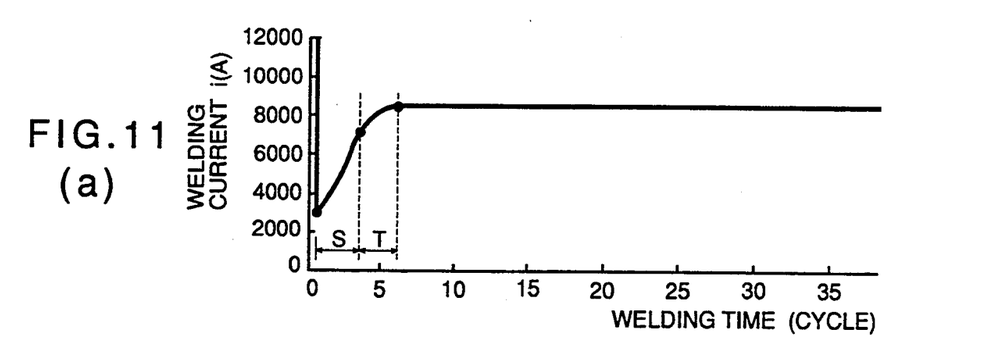
FIGS. 11(a) to 11(d) are graphs illustrating the operation of the fourth embodiment.

When welding proceeds to the period T of FIG. 11(c), dr/dt becomes plus. In this case, the increment ΔI is set to a small value SMALLΔI in Step S66 in FIG. 8. As the result, welding current slowly increases, as shown in the period T in FIG. 11(a). This allows welding current to be correctly adjusted to an optimum.

Figure 9:
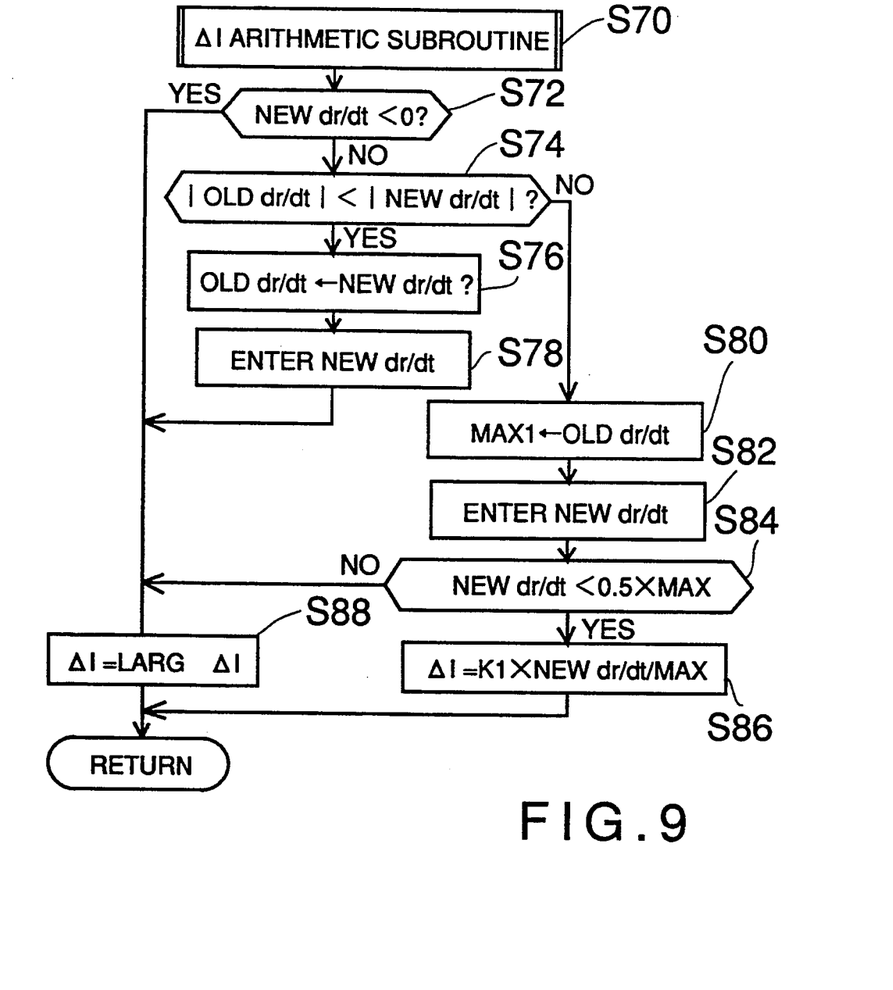
FIG. 9 is a flow chart of another procedure for determining an increment of welding current in the fourth embodiment.

The increment ΔI of welding current may be determined in accordance with a procedure as shown in FIG. 9. In this case, Steps S72 and S88 are provided to set the increment ΔI to the maximum LARGΔI, while dr/dt is a minus value, that is, in the period S. Then, Steps S74 to S78 are used to keep the maximum increment LARGΔI, while the rate of change increases, that is, until a timing N in FIG. 11(c). The process from Step S84 to Step S88 allows the maximum increment LARG ΔI to be kept, until the rate of change reaches 50% of the peak value, that is, until a timing 0 in FIG. 11(c). After the timing 0, the increment ΔI decreases in correspondence with decrease of dr/dt in Step S86.

This embodiment uses the maximum increment ΔI within such a wide range as to prevent degradation of control precision, permitting substantial reduction of time required for adjustment. Completion of welding is determined in such a manner as described with respect to the first embodiment, and a detailed description is omitted.

Fifth Embodiment

Figure 12:
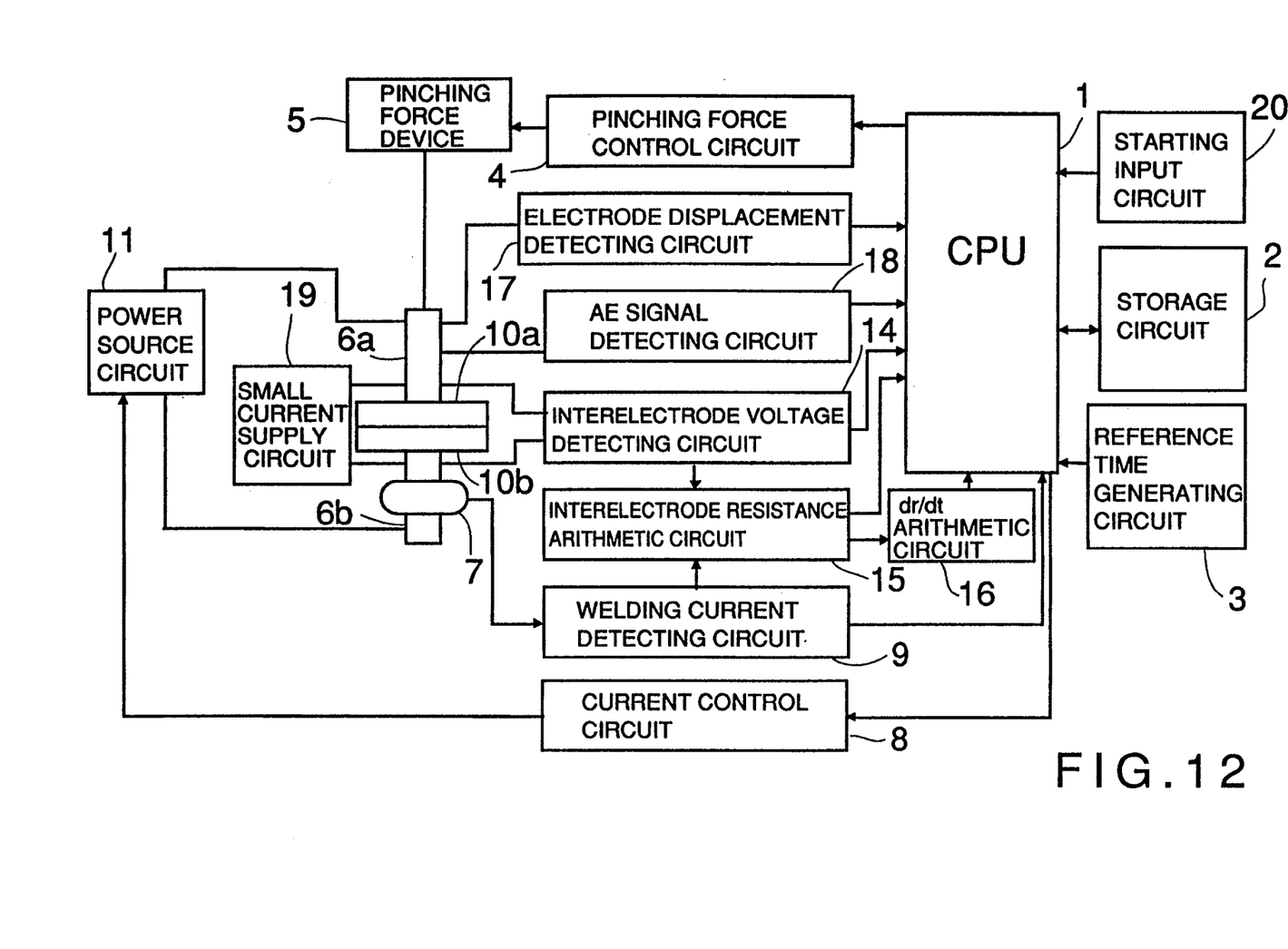
FIG. 12 is a block diagram of a system configuration of a fifth embodiment.

A fifth embodiment has a system configuration as shown in FIG. 12. This system is additionally provided with a circuit 17 for detecting an amount of displacement of the electrode 6a (amount of displacement of the position of the electrode 6a caused by progress of welding after beginning of application of pinching force) and a circuit 18 for detecting an acoustic emission (AE) signal. Detection signals from these detecting circuits 17, 18 are inputted to the CPU 1.

In the first to fourth embodiments, the timing when interelectrode resistance shifts from an upward tendency to an downward tendency (timing when the rate of change of resistance changes from plus to minus) is detected to determine the time when nugget begins to grow up.

Figure 13A:
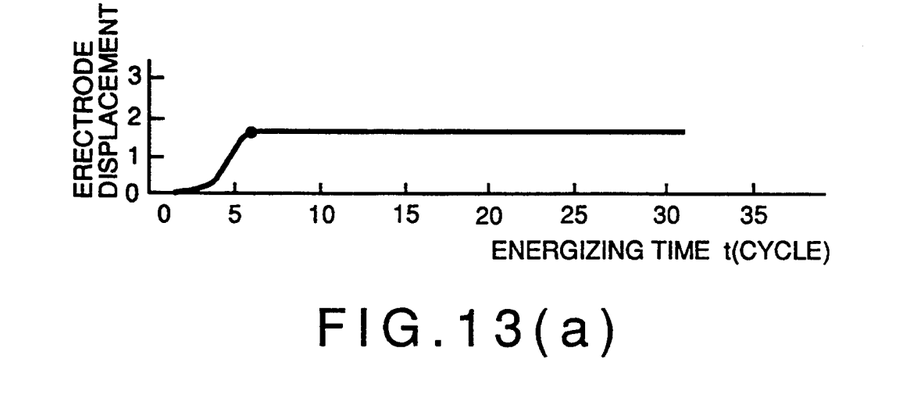
FIGS. 13(a) and 13(b) are graphs illustrating the operation of the fifth embodiment.
Figure 13B:
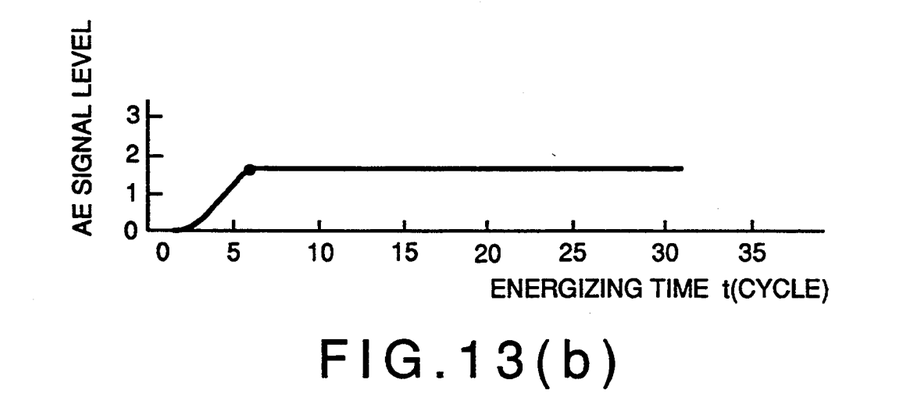

When nugget begins to grow up, resistance shifts from an upward tendency to a downward tendency, and the amount of displacement of the electrode becomes constant, as shown in FIG. 13(a). Further, as shown in FIG. 13(b), the AE signal is kept at its maximum level. Thus, Step S8 may be replaced by a process of determining a point at which the rate of change of the amount of electrode displacement becomes substantially zero, or a process of determining a point at which the rate of change of the AE signal becomes substantially zero for detecting the time when nugget begins to grow up.

In this way, welding can be also executed with the welding current and/or the pinching force maintained at the values corresponding to the beginning of nugget growth.

What is claimed is:

1. A controller for a welding machine in which workpieces are pinched between a pair of electrodes through which welding current is supplied to weld the workpieces, said controller comprising;

means for detecting an amount of resistance between the electrodes;

means for monitoring occurrence of a phenomenon that interelectrode resistance detected by the detecting means shifts from an upward tendency to a downward tendency; and welding current adjusting means for increasing the amperage of welding current with time from a low value insufficient for welding, until the monitoring means monitors the occurrence of the phenomenon, and maintaining the amperage at a constant value when the monitoring means monitors the occurrence of the phenomenon.

2. A controller as defined in claim 1, further comprising means for causing a decrease of the increments of welding current in response to a change in the time derivative of interelectrode resistance from a positive to a negative value.

3. A controller for a welding machine in which workpieces are pinched between a pair of electrodes through which welding current is supplied to weld the workpieces, with the force for pinching the workpieces being variable, said controller comprising;

means for detecting an amount of resistance between the electrodes;

means for monitoring occurrence of a phenomenon that interelectrode resistance detected by the detecting means shifts from an upward tendency to a downward tendency; and pinching force adjusting means for increasing pinching force with time from a low value insufficient for welding, until the monitoring means monitors the occurrence of the phenomenon, and maintaining the pinching force at a constant value when the monitoring means monitors the occurrence of the phenomenon.

4. A controller for a welding machine in which workpieces are pinched between a pair of electrodes through which welding current is supplied to weld the workpieces, with the force for pinching the workpieces being variable, said controller comprising;

means for detecting an amount of resistance between the electrodes;

means for monitoring occurrence of a phenomenon that interelectrode resistance detected by the detecting means shifts from an upward tendency to a downward tendency; and welding current and pinching force adjusting means for increasing the amperage of welding current and for increasing the pinching force with time from respective low values insufficient for welding, until the monitoring means monitors the occurrence of the phenomenon, and thereafter maintaining the amperage of welding current and the pinching force at respective constant values when the monitoring means monitors the occurrence of the phenomenon.

5. A controller for a welding machine in which workpieces are pinched between a pair of electrodes through which welding current is supplied to weld the workpieces, said controller comprising;

means for calculating values corresponding to the resistance between the electrodes and for determining changes of said resistance values;

means for determining the occurrence of a shift of said resistance values from an upward tendency to a downward tendency; and welding current adjusting means for incrementally increasing the amperage of welding current as a function of time from a low current value which is insufficient for welding, until the occurrence of said shift and maintaining the amperage reached at the time of said shift at a substantially constant value.

6. A controller as defined in claim 5, wherein said welding current adjusting means includes means for changing the increments of welding current in response to the output of said means for determining changes of the resistance values.

7. A controller for a welding machine in which workpieces are pinched between a pair of electrodes through which welding current is supplied to weld the workpieces, with the force for pinching the workpieces being variable, said controller comprising;

means for calculating values corresponding to the resistance between the electrodes and for determining changes of said resistance values;

means for determining the occurrence of a shift of said resistance values from an upward tendency to a downward tendency; and pinching force adjusting means for incrementally increasing the pinching force as a function of time from a low force value which is insufficient for welding, until the occurrence of said shift, and maintaining the pinching force level at the time of said shift at a substantially constant value.

8. A controller for a welding machine in which workpieces are pinched between a pair of electrodes through which welding current is supplied to weld the workpieces, with the force for pinching the workpieces being variable, said controller comprising;

means for calculating values corresponding to the resistance between the electrodes and for determining changes of said resistance values;

means for determining the occurrence of a shift of said resistance values from an upward tendency to a downward tendency;

welding current and pinching force adjusting means for incrementally increasing the amperage of welding current and incrementally increasing the pinching force as a function of time from respective low values which are insufficient for welding, until the occurrence of said shift, and maintaining the amperage of welding current and the pinching force levels at the time of said shift at substantially constant values.

9. A controller for a welding machine in which workpieces are pinched between a pair of electrodes through which welding current is supplied to weld the workpieces, said controller comprising;

first means for detecting an amount of displacement of an electrode;

second means for detecting an amount of acoustic emission;

means for monitoring occurrence of a phenomenon that a signal detected by at least one of said first and second detecting means shifts from an upward tendency to a constant level; and means for incrementally increasing with respect to time at least one of the amperage of welding current and force for pinching the workpiece from a low value which is insufficient for welding, until such time that the monitoring means indicates the occurrence of said phenomenon, and maintaining the amperage of the welding current and the force for pinching at constant values.

* * * * *